(12) United States Patent
Elliott et al.

(10) Patent No.: US 7,673,167 B2
(45) Date of Patent: Mar. 2, 2010

(54) RAID ARRAY DATA MEMBER COPY OFFLOAD IN HIGH DENSITY PACKAGING

(75) Inventors: John C. Elliott, Tucson, AZ (US);
Robert A. Kubo, Tucson, AZ (US);
Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/671,539

(22) Filed: Feb. 6, 2007

(65) Prior Publication Data

US 2008/0189723 A1 Aug. 7, 2008

(51) Int. Cl.
*G06F 11/00* (2006.01)
(52) U.S. Cl. ......................................... 714/3
(58) Field of Classification Search ................ 714/3–8, 714/13, 15, 16, 39, 42, 43, 54, 56
See application file for complete search history.

(56) References Cited

U.S. PATENT DOCUMENTS

| | | | |
|---|---|---|---|
| 5,664,187 A | 9/1997 | Burkes et al. | |
| 6,202,124 B1 | 3/2001 | Kern et al. | |
| 6,282,619 B1 | 8/2001 | Islam et al. | |
| 6,530,004 B1 | 3/2003 | King et al. | |
| 6,760,869 B2 * | 7/2004 | Lam | 714/42 |
| 7,082,498 B2 | 7/2006 | Chatterjee et al. | |
| 7,143,305 B2 * | 11/2006 | Hajji et al. | 714/2 |
| 7,146,448 B2 * | 12/2006 | Davies et al. | 710/302 |
| 7,340,642 B1 * | 3/2008 | Coatney | 714/7 |
| 7,434,107 B2 * | 10/2008 | Marks | 714/43 |
| 2005/0015653 A1 * | 1/2005 | Hajji et al. | 714/6 |
| 2005/0086429 A1 | 4/2005 | Chatterjee et al. | |
| 2005/0102557 A1 * | 5/2005 | Davies et al. | 714/11 |
| 2006/0015771 A1 * | 1/2006 | Van Gundy et al. | 714/7 |
| 2006/0059306 A1 | 3/2006 | Tseng | |
| 2006/0112298 A1 | 5/2006 | Wong | |
| 2006/0155944 A1 | 7/2006 | Kano | |
| 2006/0271818 A1 * | 11/2006 | Chien | 714/13 |
| 2006/0282701 A1 * | 12/2006 | Davies et al. | 714/6 |
| 2008/0126849 A1 * | 5/2008 | Kotzur et al. | 714/7 |
| 2008/0155218 A1 * | 6/2008 | Elliott et al. | 711/165 |

\* cited by examiner

*Primary Examiner*—Nadeem Iqbal
(74) *Attorney, Agent, or Firm*—Griffiths & Seaton PLLC (57) ABSTRACT

A computer-implemented method replaces a redundant array of independent disks (RAID) array member storage device configured in high density packaging. The high density packaging includes a plurality of field-replaceable units (FRUs). Each FRU has an associated plurality of storage devices. A first spare storage device of a first FRU is captured. The first FRU is dedicated as a plurality of spare storage devices by a RAID controller. A small computer system interface (SCSI) enclosure services (SES) processor (SESP) is initialized to read data from the RAID array member storage device and transfer the data to the first spare storage device. The first spare storage device and the RAID array member storage device are co-resident within a serial attached small computer system interface (SAS) expander local port domain.

20 Claims, 8 Drawing Sheets

RAID ARRAY DATA MEMBER COPY OFFLOAD IN HIGH DENSITY PACKAGING

BACKGROUND OF THE INVENTION

1. Field of the Invention

The present invention relates in general to computers, and more particularly to a system and method of redundant array of independent disks (RAID) array data member copy offloading in high density packaging storage systems.

2. Description of the Prior Art

Data storage systems are used to store information provided by one or more host computer systems. Such data storage systems receive requests to write information to a plurality of data storage devices and requests to retrieve information from that plurality of data storage devices. It is known in the art to configure the plurality of data storage devices into two or more storage arrays.

There are scenarios where an array repair action (sparing activity) results in a less-than-optimum configuration of the RAID array. In some cases, it may be desirable to replace/migrate a RAID array member storage device of a configuration. Examples of such cases include a RAID array repair action (sparing activity) resulting in an intermix of storage device types with a less-than-optimal configuration. The intermix of storage devices can include such non-aligned characteristics as a device capacity mismatch, device performance characteristics, including speed (RPM) and interface rate, device reliability characteristics such as enterprise class, near-line class, and desktop class, and storage device network position. In addition to the foregoing characteristics, a multi-storage device service boundary may require data migration activities to create an acceptable service boundary.

To migrate the data from an active RAID array member (source) to a new target device, it is desirable to perform some sort of copying activity to migrate the data from source to target rather than forcing the RAID array into a rebuild of the device that is desired to be migrated to the new device. Prior art includes the RAID controller forming a RAID 1 relationship between the source and target device and performing a mirror rebuild to synchronize the data between the source and target devices. This method requires significant RAID controller and storage device fabric resources to complete. The resources consumed by the RAID controller and storage device network fabric impact the overall system performance during the duration of a particular activity.

SUMMARY OF THE INVENTION

A need exists for a system and method for the migration of data or the replacement of a RAID array member which minimizes the use of system resources as described. The system and method should make use of existing storage devices and network fabrics to provide for an efficient, cost-effective solution. Furthermore, a need exists for a system and method as described which is intended for higher density packaging where multiple storage devices are located within a single higher level service boundary.

In one embodiment, the present invention is a computer-implemented method for replacing a redundant array of independent disks (RAID) array member storage device configured in high density packaging, the high density packaging including a plurality of field-replaceable units (FRUs), each FRU having an associated plurality of storage devices, comprising capturing a first spare storage device of a first FRU, the first FRU dedicated as a plurality of spare storage devices by a RAID controller, and initializing a small computer system interface (SCSI) enclosure services (SES) processor (SESP) to read data from the RAID array member storage device and transfer the data to the first spare storage device, wherein the first spare storage device and the RAID array member storage device are co-resident within a serial attached small computer system interface (SAS) expander local port domain.

In another embodiment, the present invention is a system for replacing a redundant array of independent disks (RAID) array member storage device configured in high density packaging, the high density packaging including a plurality of field-replaceable units (FRUs), each FRU having an associated plurality of storage devices, comprising a RAID controller for capturing a first spare storage device of a first FRU, the first FRU dedicated as a plurality of spare storage devices by a RAID controller, and a small computer system interface (SCSI) enclosure services (SES) processor (SESP) which is initialized by the RAID controller to read data from the RAID array member storage device and transfer the data to the first spare storage device, wherein the first spare storage device and the RAID array member storage device are co-resident within a serial attached small computer system interface (SAS) expander local port domain.

In still another embodiment, the present invention is an article of manufacture including code for replacing a redundant array of independent disks (RAID) array member storage device configured in high density packaging, the high density packaging including a plurality of field-replaceable units (FRUs), each FRU having an associated plurality of storage devices, wherein the code is capable of causing operations to be performed comprising capturing a first spare storage device of a first FRU, the first FRU dedicated as a plurality of spare storage devices by a RAID controller, and initializing a small computer system interface (SCSI) enclosure services (SES) processor (SESP) to read data from the RAID array member storage device and transfer the data to the first spare storage device, wherein the first spare storage device and the RAID array member storage device are co-resident within a serial attached small computer system interface (SAS) expander local port domain.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

RAID storage subsystems are designed to tolerate single and sometimes multiple storage device failures within an array element. The industry is moving toward creating smaller mechanical form factor storage devices, which have a volumetric footprint that is much smaller than the current standard storage device. Reduced mechanical volume storage devices present an opportunity to create a paradigm shift for the manner in which the devices are packaged to be integrated within the industry standard rack mounted architecture. To make the packaging as efficient it is possible to create configurations that use more of the available volume than the standard "rack mounted" infrastructure volume presents. To most efficiently capture the available volume to create high density packaging configurations, a model can be created where independent access to all storage devices for concurrent repair activities is contemplated. In this "high density packaging" a situation can be created where multiple storage devices are integrated into a single service boundary.

Figure 1:
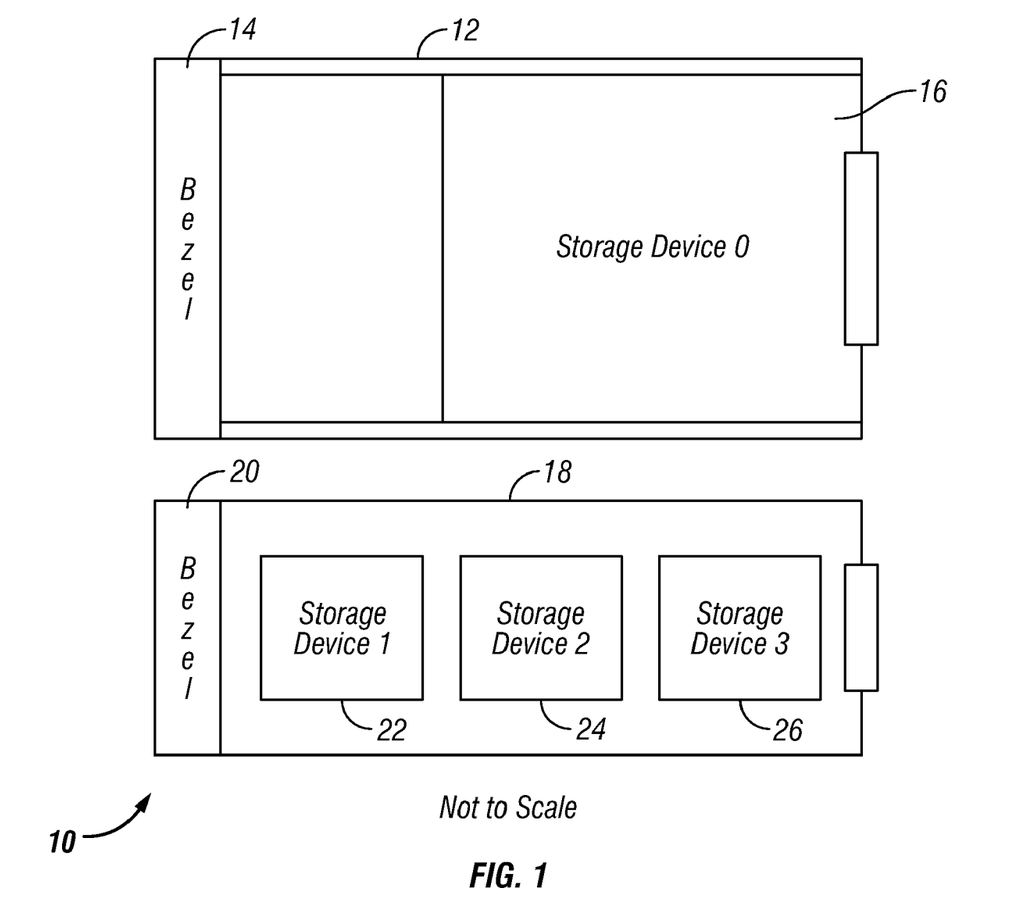
FIG. 1 illustrates a storage service boundary having a storage device, and an example multiple small form factor devices embodiment packaged within a single service boundary.

FIG. 1 shows such an example 10 of a high density packaging, first showing a single storage device 16 integrated into a service boundary 12 with a bezel 14, and a plurality of small form factor storage devices 22, 24, and 26 packaged within a single service boundary 18 with incorporated bezel 20.

Storage systems provide high availability and reliability characteristics through architectural design implementations that provide redundancy to protect the system. Fault tolerance is achieved in systems via redundant fault tolerant hardware designs and user data is stored in arrays of storage devices configured in a RAID scheme. RAID schemes (RAID levels 1, 2, 3, 4, 5, 10 [0+1, 1+0]) can provide a single level of redundant protection and are tolerant of a single device failure prior to being exposed to data loss from an additional failure. Online RAID array repair, generally known as hot sparing, restores RAID array redundancy following a failure of a storage device. There are scenarios where a array repair action (sparing activity) results in a less than optimum configuration of the RAID array. In some cases, it may be desirable to replace/migrate a RAID array member storage device of a configuration. Again, one such case is in the high density packaging described in FIG. 1, where multiple storage devices are located within a single higher level service boundary.

The present invention provides a method of spare management which enables non-disruptive service in a multi-device service boundary environment with maximized reliability during a service repair action. A system and method for high density packaging configuration schemes can utilize symmetry rules for creating a single logical service boundary for a multi-device service boundary. Whether the 'N' devices of a high density packaging concept are contained within a single or multiple RAID arrays a symmetric number of compatible spares are required within the system to manage the failure and repair scenarios. The system and method do not limit or require that all of the spare devices be maintained within a single logical service boundary nor within the same type of enclosure. They only require that there are a number of available compatible devices within the same RAID Controller domain equal to or greater than the number of devices that are contained within the single service boundary of the high density packaging. A consideration for selection of the spare devices within the RAID Controller domain, is that if less than N spares are contained within a logical service boundary then the utility of that element is compromised when the service boundary that it is a sub-element of requires service.

When a device fails that is an element of a multi-device service boundary, the normal RAID sparing activity is executed capturing a spare device and rebuilding as required. The high density multi-device element is treated as a single logical service boundary by the system. When the device is prepared for service, the following activities must be executed to place the multi-element device service boundary in a condition for repair/service/replacement. The system is required to migrate the data from the remaining active elements [devices that are active members of a RAID array relationship] within the service boundary to other compatible devices within the RAID Controller domain. This data migration can be managed in a variety of ways. Two examples follow.

In a first example A, a failure of the active "good" devices is simulated, causing an additional sparing action to occur forcing the data to be rebuilt from the existing array. In a second example B, an available compatible spare device is captured. A rebuild of the data is performed by copying the data from the "good" devices to the spare device (always perform a RAID 1 type rebuild from good device within the multi-device service boundary to the spare device, regardless of RAID level of array impacted by the data migration).

Figure 2:
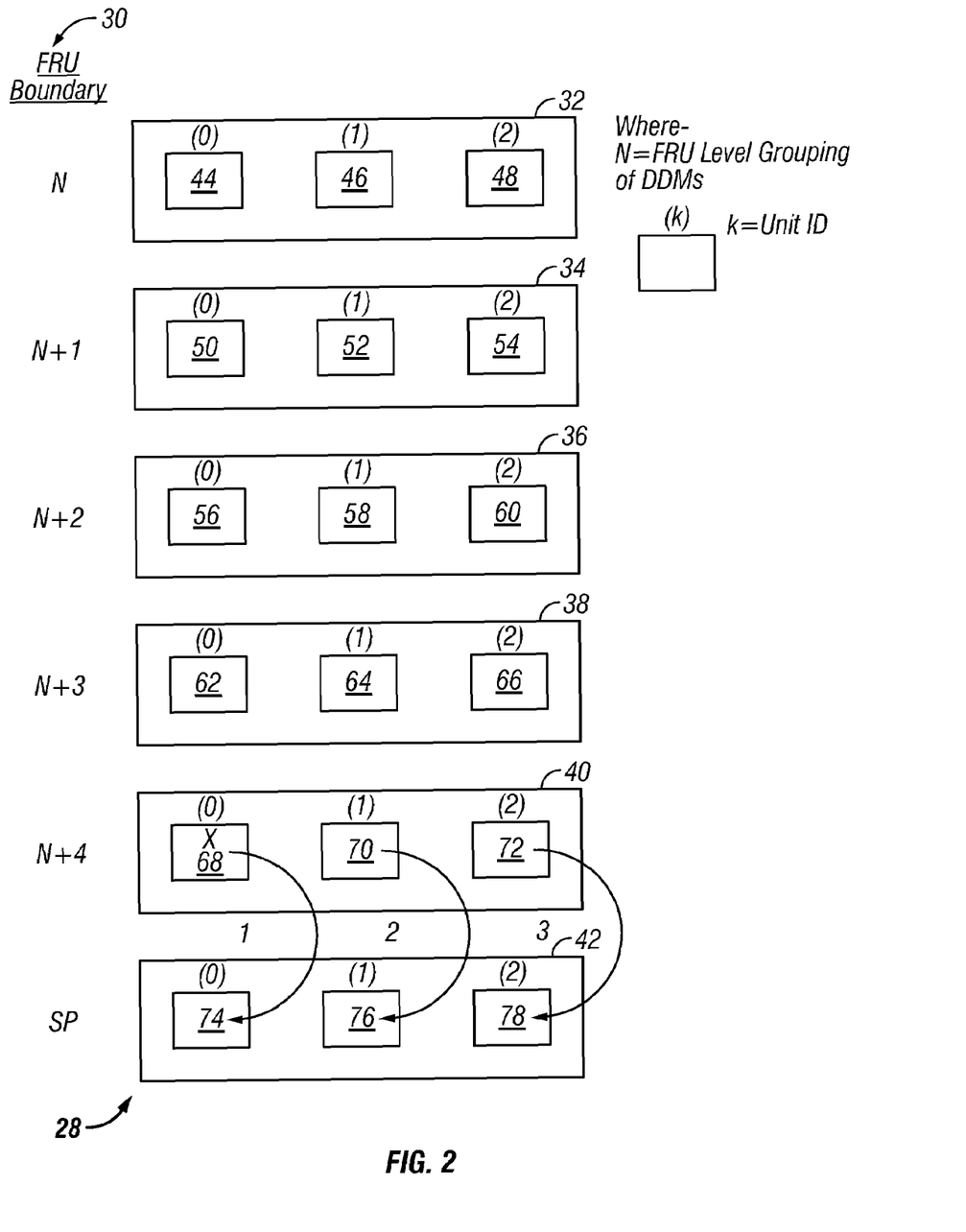
FIG. 2 illustrates an example high density packaging service boundary management.

FIG. 2 shows a matrix 28 of high density packaging multi-device units 32, 34, 36, 38, 40, and 42. Each unit 32-42 is a single physical Field Replaceable Unit (FRU) 32-42 or Customer Replaceable Unit (CRU) 32-42 which represents a single service boundary. The example figure shows a case where three (3) devices (e.g., devices 44, 46 and 48, or devices 50, 52, and 54) have been packaged per unit (32 or 34). The respective FRU service boundary levels from N to N+4, including a spare service level (SP) is depicted in column 30.

In another embodiment, the FRUs or CRUs may be defined to be at the device level (e.g., devices 44, 46 and 48, or devices 50, 52, and 54) having been packaged per unit (32 or 34). The service boundary remains at the high density packaging multi-device unit level (32, 34, 36, 38, 40, and 42.

FIG. 2 also depicts how a failure of a single device will be managed in said configuration to place FRU boundary N+4 into a serviceable state/condition. The instant depiction assumes that device zero (0) (also denoted device 68) of FRU N+4 fails, as indicated by the 'X' shown on the block within unit N+4 (unit 40). The RAID controller performs as it would normally and captures device zero (0) (also denoted device 74) of the spare unit SP. The RAID array that FRU N+4 device (0) was a member of, takes SP device (0) as a spare and integrates it as a member of the array and rebuilds the data set. When it is desired to place the FRU N+4 into a serviceable condition the remaining devices within its' service boundaries are migrated to the spare devices within the spare unit SP. Once the data and normal operation of N+4 devices (1) and (2) (also denoted devices 70 and 72) has been migrated to spare unit SP devices (1) and (2) respectively (also denoted devices 76 and 78), FRU unit N+4 is ready to be replaced/serviced.

The present invention provides a method to efficiently manage the data migration required to dynamically and concurrently move the data members [(1) & (2)] from within unit N+4 to the SP unit devices [(1) & (2)]. The more efficient process reduces the time window where the system is operational without available hot spare devices to provide autonomic repairs for device failures.

In high availability systems with serial device attachment (SAS, FC-AL) storage devices support multiple interface ports to reduce/eliminate/minimize exposures to single points of failure within the system. For storage systems that support single ported serial devices (SATA), the systems utilize a multiplexer device at the device interface, to provide general device compatibility with the storage device interconnect network fabric. The resultant physical topology provides two independent storage device interconnect network fabrics that provide system level redundancy to the storage unit. In modular systems each module contains an independent interconnect mechanism where the RAID controller storage device initiator can access the group of storage devices within the modular unit. Non-Blocking FC-AL switches and SAS expanders are used to provide the interconnect between storage devices and rest of the storage device interconnect fabric which are located on interface controller cards. The interface controller cards also usually provide the modular units enclosure management services processor, in many cases the processor is a small computer system interface (SCSI) enclosures services (SES) processor (SESP).

The present invention takes advantage of this characteristic and utilizes a SESP to cooperatively participate in the data migration from a RAID array member source to an eligible target device. The SESP at the direction of the RAID controller reads data from the RAID array source device and copies (writes) said data to the target device of the migration relationship. The RAID controller resources are used to manage and control the progress of the data copy between the source and target storage devices (master process) such that it is aware of where the SESP is at in the subordinate process of data copy migration. The RAID controller resources are also used to maintain a mirroring relationship between the source and target devices such that it updates the devices with the newly modified data during the data migration activity.

The present invention utilizes the RAID controller to manage the data copy process that is carried out by the local SESPs in parallel with the RAID controller maintaining write updates to the source [N+4 (1) & (2)] and target [SP (1) & (2)] to maintain the data in sync with the system state. Optimally in this invention, one SESP on each independently storage device interconnect fabric is used to manage the copy process of a particular storage device pair [N+4 (1) & SP (1) -OR- N+4 (2) & SP (2)] where ideally different RAID controllers at the system level are responsible for the storage management of the data on each primary device [N+4 (1) -AND- N+4 (2)] and therefore have responsibility for management of the copy process driven by the SESP.

The master RAID controller for each independent copy process can manage the copy process of the SESP as follows. The master RAID controller divides the source storage device capacity (Logical Block Address range) into multiple sub-regions, or sub-LBA ranges. The master RAID controller informs the peer RAID controller, if applicable, of the sub-region being assigned to the SESP to copy and the RAID controller initiators put a lock on the sub-region. In parallel the RAID controllers establish a mirroring relationship for write data updates between the source device and target device of the data copy operation. The RAID controllers will write data to the source device for ALL writes and only to the target device of the copy relationship when data is targeted to an area of the target device that has already been copied to the target device by the copy process, thus minimizing the RAID controller resources required to complete the update. The updated data will be copied to the target device by the copy process when that sub-range is copied from the source to the target by the process. The RAID controller then directs a SESP in the storage device fabric to copy the data from the source storage device to the target storage device.

In cases where the write data is to be written to the area within the sub-range assigned to the SESP to copy from the source to target devices the data is updated on the source device and carried as deferred write to target device. When the SESP reports that it has completed the copy of the sub-region assigned by the RAID controller, the RAID controller completes the deferred writes that it was carrying for the sub-region.

Optimally, both source and target devices would be resident within the SAS expander's local port domain to maintain as much of the SAS fabric available as possible. However this is not required, but in this configuration the utilization of storage device interconnect fabric bandwidth resources is optimum. The SESP reads the data from the source device sub-LBA range and writes the data to the target storage device identical location, thus creating a copy of the data image on the source storage device on the target storage device.

Figure 3:
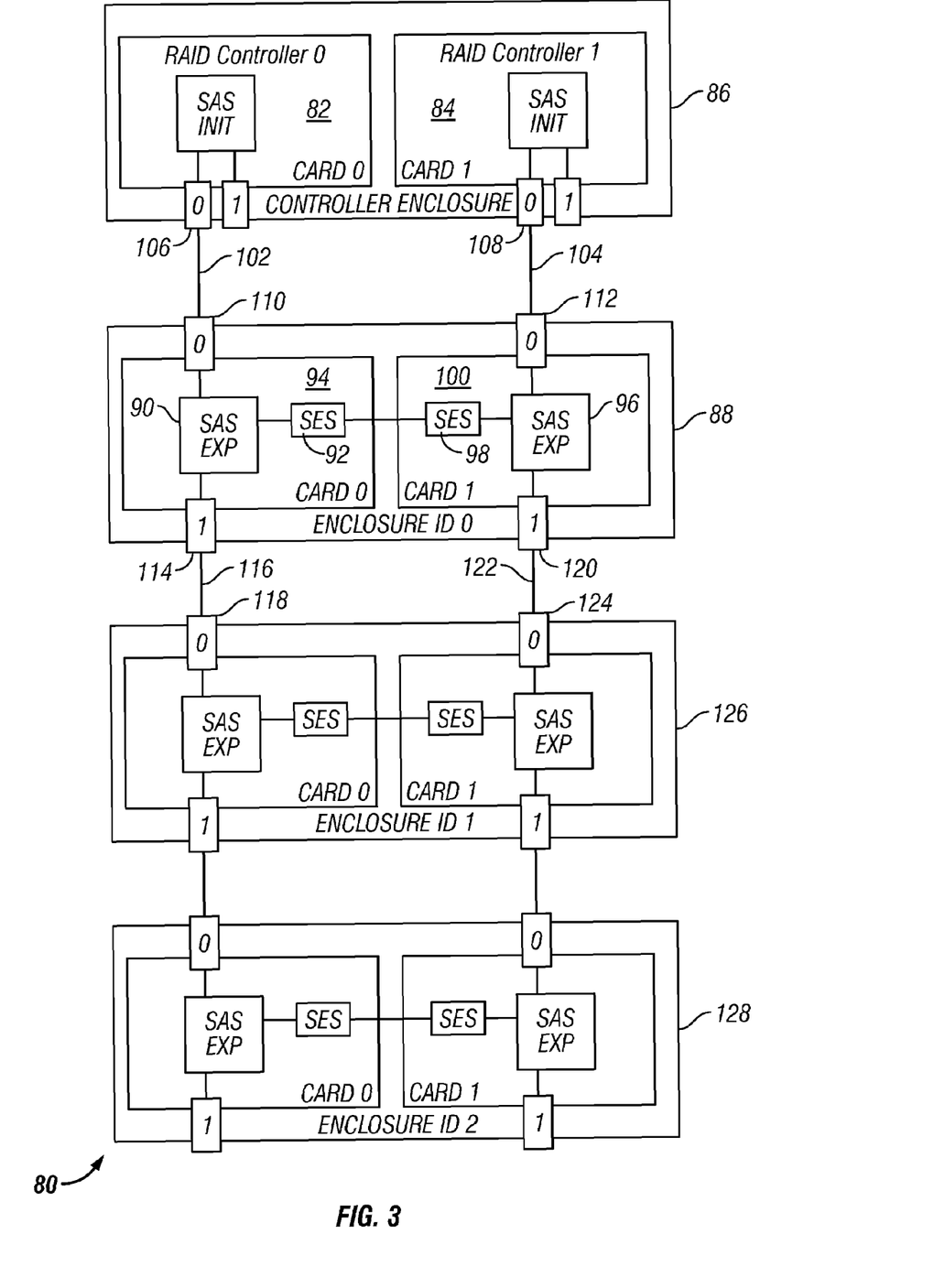
FIG. 3 describes a storage system with dual RAID controllers which are connected to storage devices via a SAS storage device interconnect fabric that implements non-blocking SAS expander devices.

FIG. 3 describes a storage system 80 with dual RAID controllers 82, 84 that are connected to storage devices via a SAS storage device interconnect fabric that implements non-blocking SAS expanders (i.e., 90, 96). Each enclosure 86, 88, 126, and 128 provides two controller cards (e.g., 94, 100) that provide a SAS Expander (e.g., 90) and a local processor (SESP) (e.g., 92) that is SAS initiator capable and has access to the SAS storage device network via the respective SAS expander. Each controller enclosure has respective communication ports, such as downstream ports 106, 108, which communicate via a signal bearing mediums 102, 104 to enclosure 88 having upstream ports 110, and 112. Similarly, downstream ports 114, 120, communicate to enclosure 126 having upstream ports 118, 124 via mediums 116, 122.

It should be noted that the controller enclosure 86 as depicted in FIG. 3 can also be a logical construct. The controller function with redundant RAID engines can exist in separate physical entities that are logically joined together in a storage controller function in addition to the single physical entity depicted in FIG. 3. One skilled in the art can appreciate the various embodiments in which the controller function and accompanying RAID capabilities can be realized.

Figure 4:
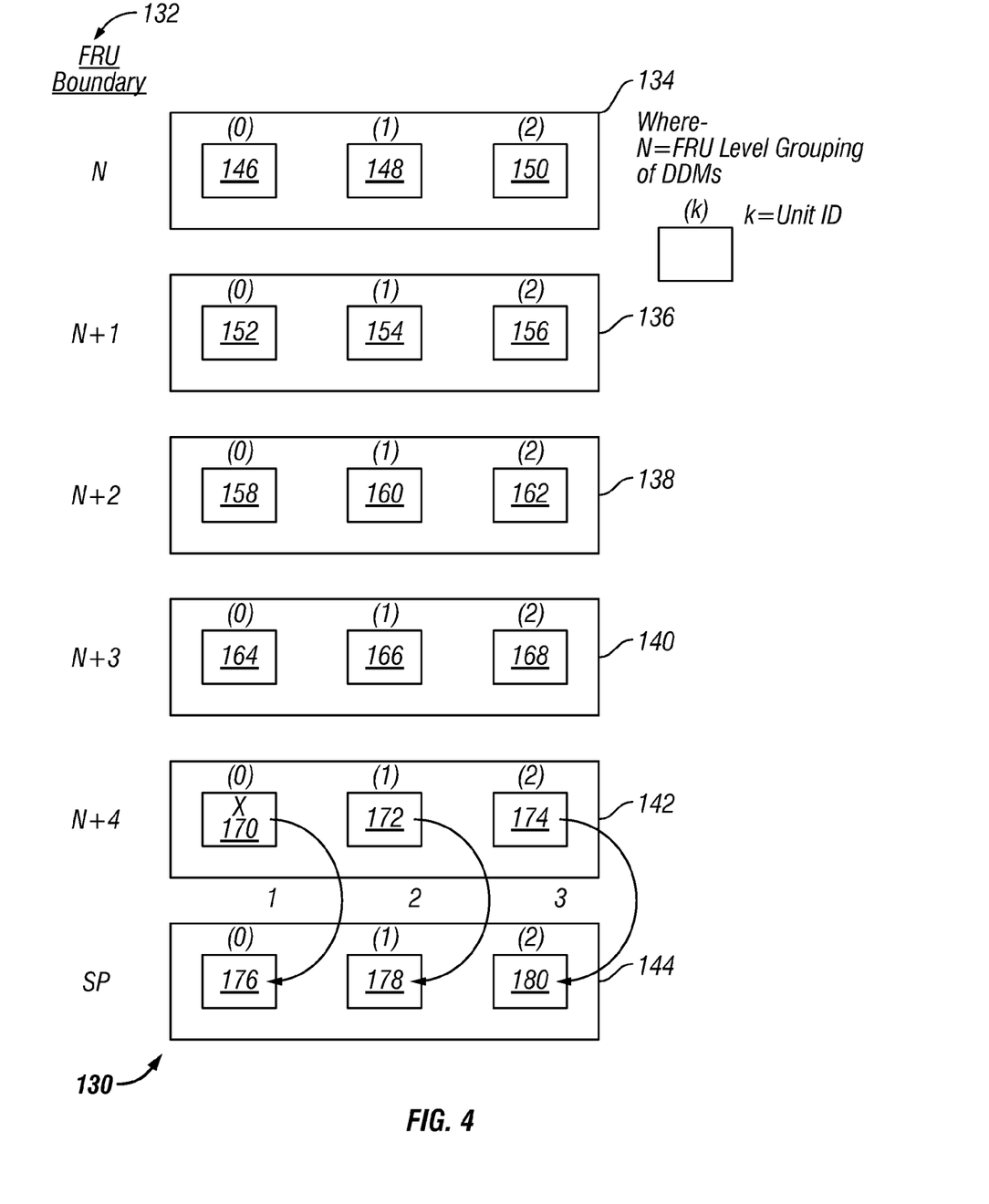
FIG. 4 describes an example scenario which requires data migration activity and a storage device replacement in accordance with the present invention.

FIG. 4 describes a scenario 130 that requires data migration activity and will be used as the reference for the remainder of the example shown. Here, as in FIG. 2, a matrix of FRU units (134-144) is shown having a plurality of storage devices (146-180) which are organized according to each respective FRU unit in an FRU boundary depicted in column 132. Scenario 130 assumes that device zero (0) of FRU N+4 fails, as indicated by the 'X' shown on the block within unit N+4. The RAID Controller performs as it would normally and captures device zero (0) of the spare unit SP. The RAID array that FRU N+4 device (0) was a member of, takes SP device (0) as a spare and integrates it as a member of the array and rebuilds the data set. When it is desired to place the FRU N+4 into a serviceable condition the remaining devices within its' service boundaries are migrated to the spare devices within the spare unit SP. Once the data and normal operation of N+4 devices (1) and (2) has been migrated to spare unit SP devices (1) and (2) respectively, FRU unit N+4 is ready to be replaced/serviced.

Figure 5:
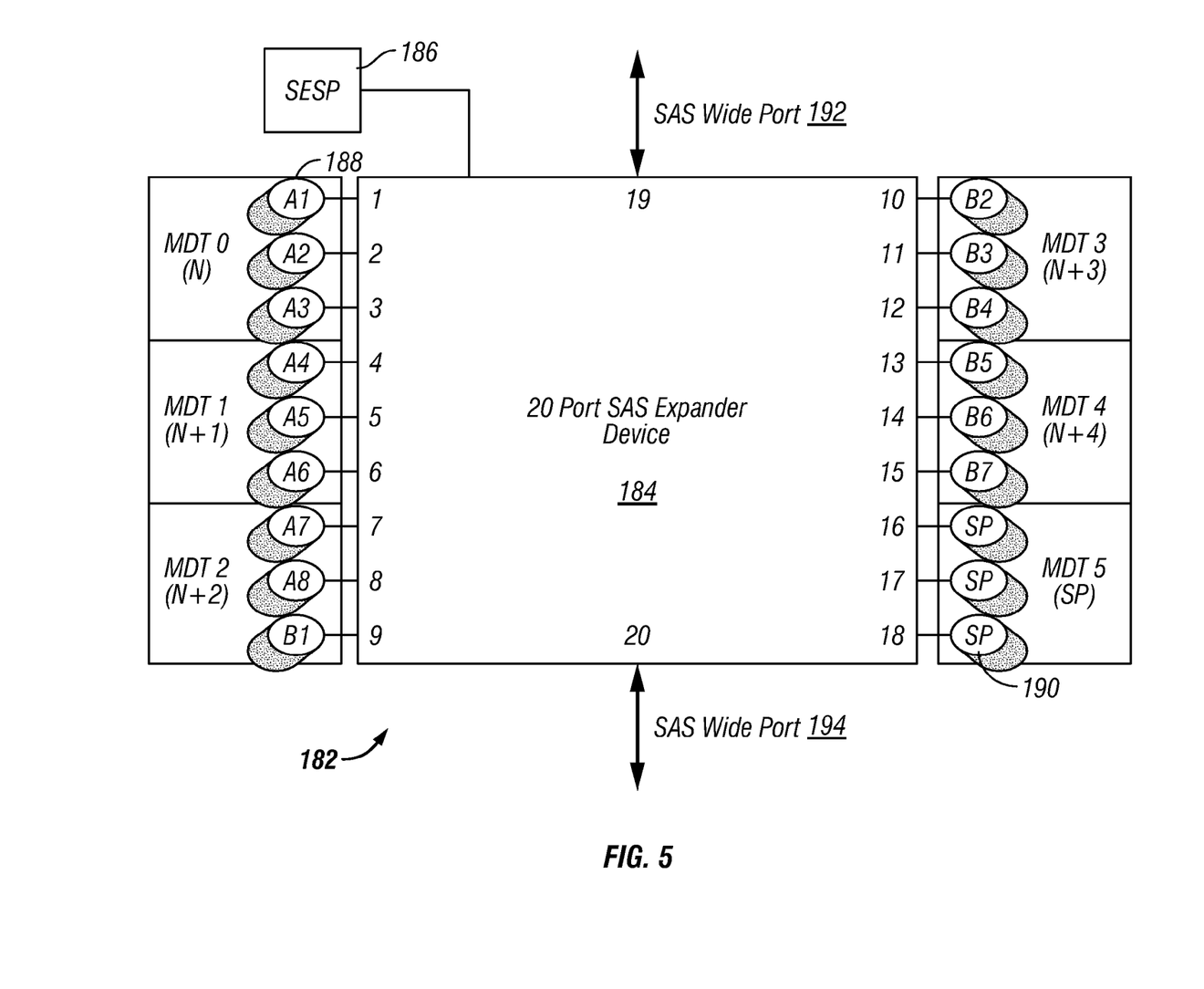
FIG. 5 describes a topology implementation which uses a non-blocking SAS expander that attaches to a single port of a dual ported storage device or to an input port to a multi-ported multiplexing device that connects a single ported storage device to a SAS expander port.

FIG. 5 describes a topology implementation 182 which uses a non-blocking SAS expander device module 184 that attaches to a single port of a dual ported storage device or to an input port to a multi-ported multiplexing device that connects a single ported storage device to a SAS Expander port. Device 184 also includes a respective SESP 186. The expander device 184 provides the capability to establish port to port connections between device ports in a non-blocking fashion. As seen in FIG. 4, a plurality of storage devices 188 is organized into FRUs in boundaries (N) to (N+4) including a (SP) spare service boundary having spare storage devices 190.

Figure 6:
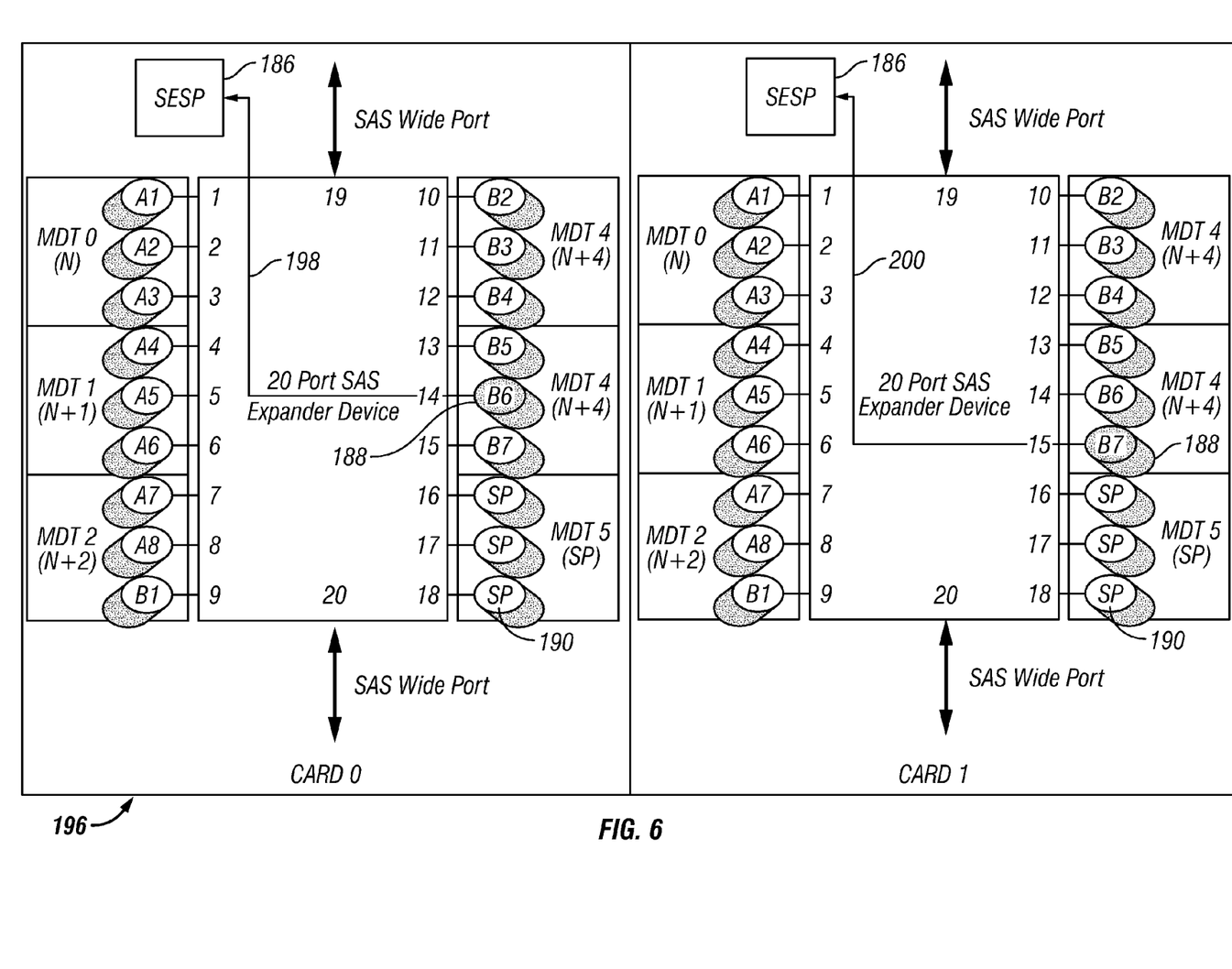
FIG. 6 describes two independent data copy activities occurring on independent storage device interconnect networks represented by card 0 and card 1 of a modular enclosure assembly.

FIG. 6 describes the two independent data copy activities 188 according to the present invention occurring on independent storage device interconnect networks represented by card 0 and card 1 of a modular enclosure assembly 196. In the figure, the internal expander connectivity for the scenario where the SESP on card 0 reads data from storage device B6 of MDT 4 (N+4) that is connected to port 14 of the SAS Expander device and the internal expander connectivity for the scenario where the SESP on card 1 reads data (represented by lines 198 and 200) from storage device B7 of MDT 4 (N+4) that is connected to port 15 of the SAS expander device.

Figure 7:
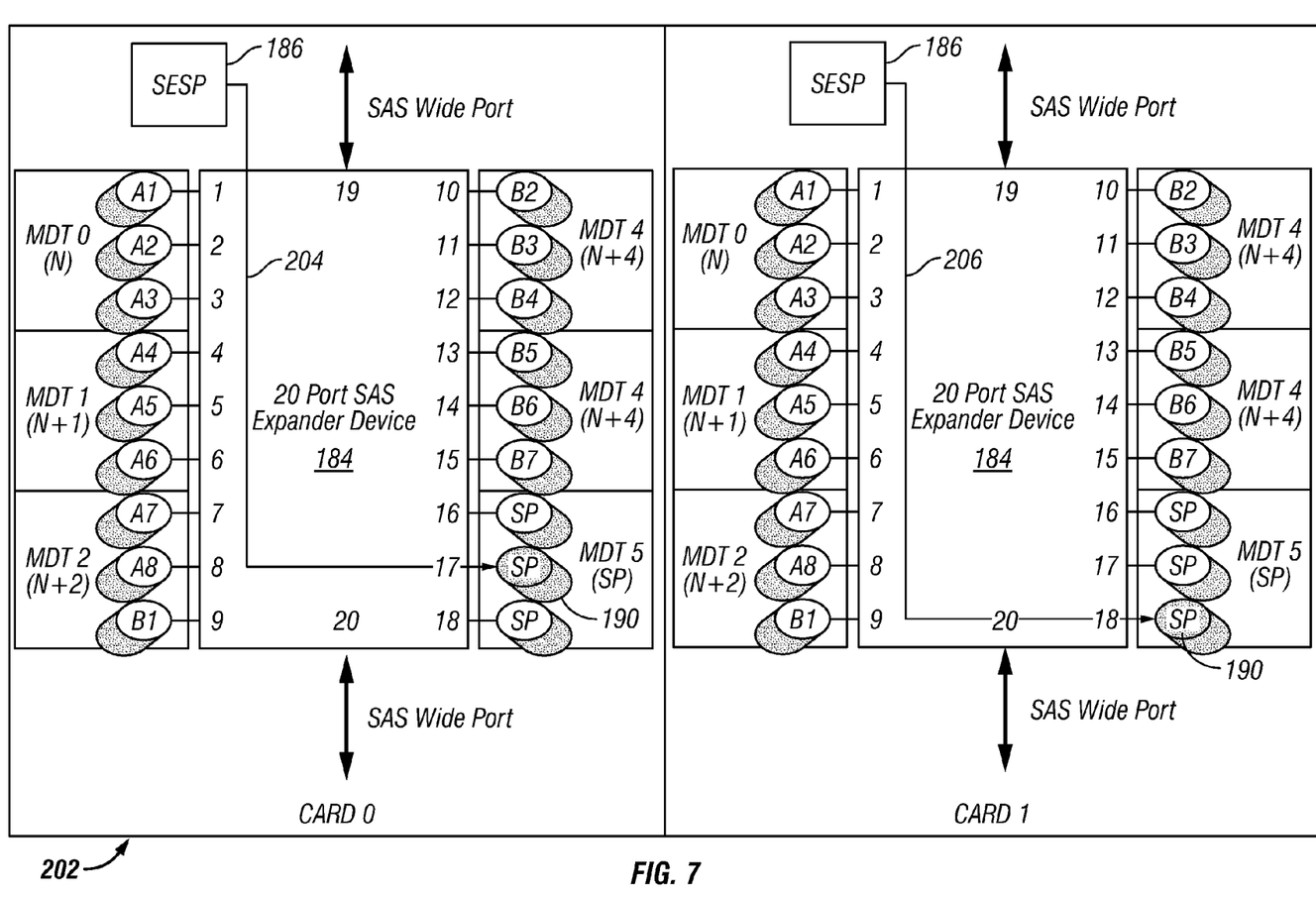
FIG. 7 describes two independent data copy write activities occurring on independent storage device interconnect networks represented by card 0 and card 1 of a modular enclosure assembly.

FIG. 7 describes the two independent data copy write activities occurring on independent storage device interconnect networks represented by card 0 and card 1 of a modular enclosure assembly 202. In the figure, the internal expander connectivity for the scenario where the SESP on card 0 writes data (represented by lines 204, 206) to storage device SP of MDT 5 (SP) that is connected to port 17 of the SAS Expander device and the internal expander connectivity for the scenario where the SESP on card 1 writes data to storage device SP of MDT 5 (SP) that is connected to port 18 of the SAS Expander device.

Figure 8:
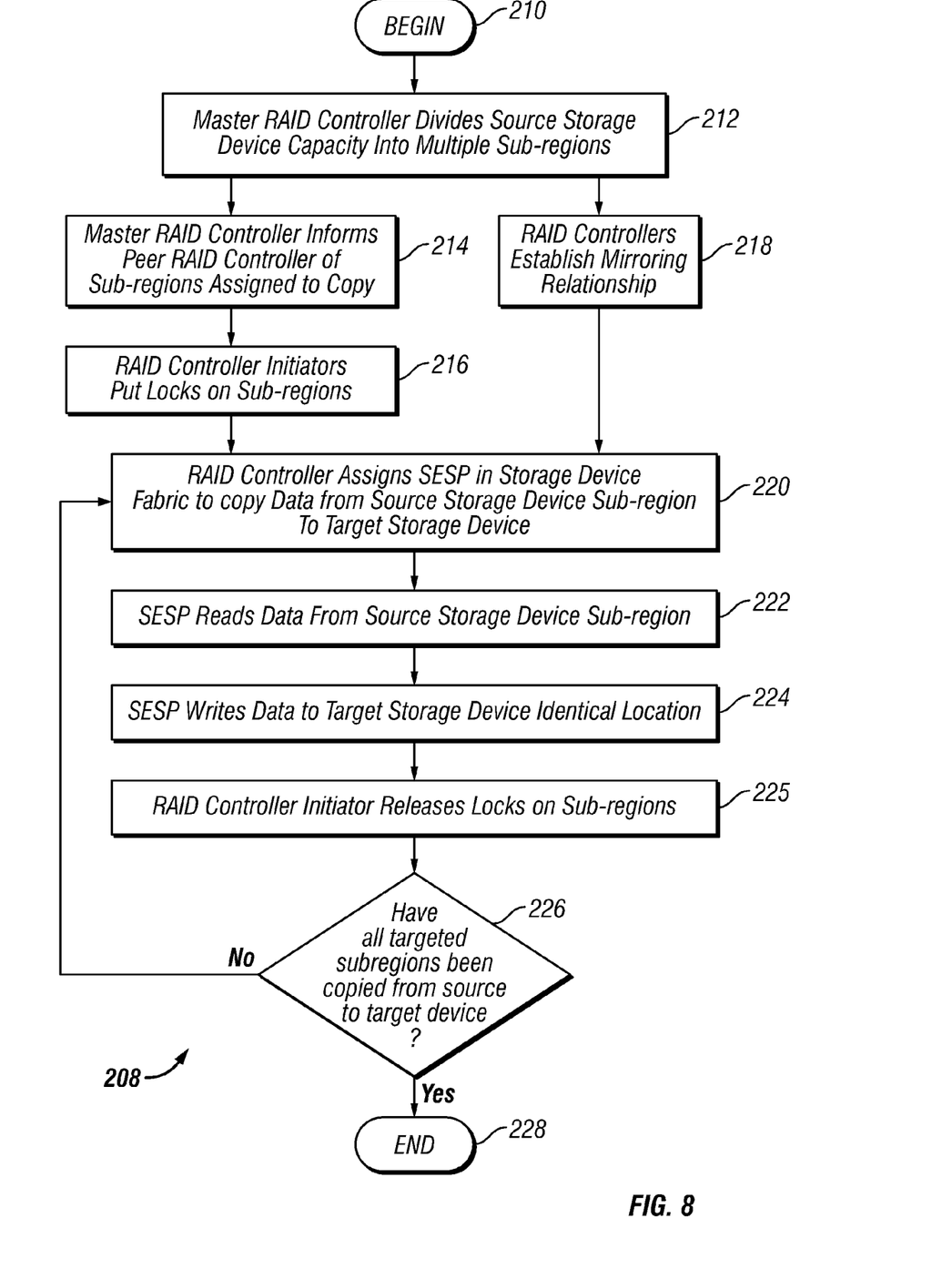
FIG. 8 illustrates an example method of operation of a computer storage system to migrate data from a source storage device to a target storage device according to the present invention.

Turning to FIG. 8, an example migration operation 208 is depicted according to the present invention. The operation begins (step 210) by a master RAID controller dividing applicable source storage devices into multiple sub-regions or sub-LBA regions as previously described (step 212). The following steps 214, 216 and step 218 can be then performed in parallel. In step 214, if applicable, the master RAID controller informs a peer RAID controller of respective sub-regions which have been assigned for the migration operation. As a next step, the RAID controller initiators lock the respective sub-regions of storage activity which is within the scope of the migration activity (step 216). Contemporaneously, the RAID controllers operate to establish a mirroring relationship for write data updates between the source device and the target device of the migration operation (step 218). The RAID controller then assigns a designated SESP in the respective storage device fabric to perform the migration operation (step 220). To perform the migration operation, the SESP reads data from a designated source storage device sub-region (step 222) and writes the data to an identical location on the target storage device (step 224). As a next step, the RAID controller initiators release the locks on the respective sub-regions which have been assigned for the migration operation (step 225). The RAID controller manages each respective sub-region of the plurality of sub-regions assigned to copy by assigning a respective SESP to the sub-region and then overseeing the copying function performed by the SESP for each sub-region until all targeted sub-regions have been copied from source to target device (step 226). The method 208 then ends (step 228).

Software and/or hardware to implement the method 208, or other functions previously described, such as the described assignment of a respective SESP in the storage device fabric to perform the migration operation, can be created using tools currently known in the art. The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of providing for data migration and RAID array member copy offloading in a high-density packaging configuration as described, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method for replacing a redundant array of independent disks (RAID) array member storage device configured in high density packaging, the high density packaging including a plurality of field-replaceable units (FRUs), each FRU having an associated plurality of storage devices, comprising:
    capturing a first spare storage device of a first FRU, the first FRU dedicated as a plurality of spare storage devices by a RAID controller; and
    initializing a small computer system interface (SCSI) enclosure services (SES) processor (SESP) to read data from the RAID array member storage device and transfer the data to the first spare storage device, wherein the first spare storage device and the RAID array member storage device are co-resident within a serial attached small computer system interface (SAS) expander local port domain.

2. The method of claim 1, wherein initializing a SESP to read data from the RAID array member storage device is performed by the RAID controller.

3. The method of claim 1, further including migrating remaining storage devices within a second FRU having the RAID array member storage device to the first FRU.

4. The method of claim 3, wherein migrating remaining storage devices within the second FRU further includes initializing the SESP to read and transfer data from the remaining storage devices to a plurality of spare storage devices within the first FRU.

5. The method of claim 2, wherein initializing the SESP to read data is performed in parallel with the RAID controller maintaining write updates to the first storage device and the RAID array member storage device.

6. The method of claim 1, wherein a single SESP corresponding to an independent storage device interconnect fabric is dedicated to read data from the RAID array member storage device and the first spare storage device.

7. The method of claim 1, wherein management of data on the RAID array member storage device and the first spare storage device is performed using differing RAID controllers.

8. The method of claim 1, further including dividing the RAID array member storage device into a plurality of sub-regions, informing a peer RAID controller of a first sub-region of the plurality of sub-regions, the first sub-region assigned to the SESP for transferring the data, and locking the first sub-region to prevent data contamination.

9. The method of claim 8, wherein locking the first sub-region is performed by the RAID controller.

10. A system for replacing a redundant array of independent disks (RAID) array member storage device configured in high density packaging, the high density packaging including a plurality of field-replaceable units (FRUs), each FRU having an associated plurality of storage devices, comprising:
    a RAID controller for capturing a first spare storage device of a first FRU, the first FRU dedicated as a plurality of spare storage devices by a RAID controller; and
    a small computer system interface (SCSI) enclosure services (SES) processor (SESP) which is initialized by the RAID controller to read data from the RAID array member storage device and transfer the data to the first spare storage device, wherein the first spare storage device and the RAID array member storage device are co-resident within a serial attached small computer system interface (SAS) expander local port domain.

11. The system of claim 10, wherein the RAID controller migrates remaining storage devices within a second FRU having the RAID array member storage device to the first FRU.

12. The system of claim 11, wherein the RAID controller directs the SESP to read and transfer data from the remaining storage devices to a plurality of spare storage devices within the first FRU.

13. The system of claim 10, wherein the RAID controller initializes the SESP to read data in parallel with maintaining write updates to the first storage device and the RAID array member storage device.

14. The system of claim 10, wherein a single SESP corresponding to an independent storage device interconnect fabric is dedicated to read data from the RAID array member storage device and the first spare storage device.

15. The system of claim 10, wherein management of data on the RAID array member storage device and the first spare storage device is performed using differing RAID controllers.

16. The system of claim 10, wherein the RAID controller divides the RAID array member storage device into a plurality of sub-regions, informs a peer RAID controller of a first sub-region of the plurality of sub-regions, the first sub-region assigned to the SESP for transferring the data, and locks the first sub-region to prevent data contamination.

17. An article of manufacture including code for replacing a redundant array of independent disks (RAID) array member storage device configured in high density packaging, the high density packaging including a plurality of field-replaceable units (FRUs), each FRU having an associated plurality of storage devices, wherein the code is capable of causing operations to be performed comprising:
    capturing a first spare storage device of a first FRU, the first FRU dedicated as a plurality of spare storage devices by a RAID controller; and
    initializing a small computer system interface (SCSI) enclosure services (SES) processor (SESP) to read data from the RAID array member storage device and transfer the data to the first spare storage device, wherein the first spare storage device and the RAID array member storage device are co-resident within a serial attached small computer system interface (SAS) expander local port domain.

18. The article of manufacture of claim 17, wherein initializing a SESP to read data from the RAID array member storage device is performed by the RAID controller.

19. The article of manufacture of claim 17, further including code capable of performing the operation of migrating remaining storage devices within a second FRU having the RAID array member storage device to the first FRU.

20. The article of manufacture of claim 19, wherein migrating remaining storage devices within the second FRU further includes initializing the SESP to read and transfer data from the remaining storage devices to a plurality of spare storage devices within the first FRU.

* * * * *